United States Patent
Crothers (10) Patent No.: US 8,010,226 B2
(45) Date of Patent: *Aug. 30, 2011

(54) APPARATUS AND METHOD FOR MEASURING AND MODIFYING COMPONENTS USING REVERSE ENGINEERING

(75) Inventor: Phillip John Crothers, Hampton East (AU)

(73) Assignee: The Boeing Company, Chicago, IL (US)

( * ) Notice: Subject to any disclaimer, the term of this patent is extended or adjusted under 35 U.S.C. 154(b) by 356 days.

This patent is subject to a terminal disclaimer.

(21) Appl. No.: 12/339,560

(22) Filed: Dec. 19, 2008

(65) Prior Publication Data

US 2010/0161094 A1 Jun. 24, 2010

(51) Int. Cl.
*G06F 19/00* (2011.01)

(52) U.S. Cl. ........ 700/195; 700/160; 700/186; 700/193; 700/250

(58) Field of Classification Search .............. 700/95–97, 700/105, 160, 182, 186, 193–195, 250, 253, 700/258, 260
See application file for complete search history.

(56) References Cited

U.S. PATENT DOCUMENTS

| | | | | |
|---|---|---|---|---|
| 4,317,644 A | * | 3/1982 | Hosoi | 409/98 |
| 4,562,392 A | * | 12/1985 | Davis et al. | 318/572 |
| 5,139,376 A | * | 8/1992 | Pumphrey | 408/1 R |
| 5,446,673 A | | 8/1995 | Bauer | |
| 5,724,264 A | * | 3/1998 | Rosenberg et al. | 702/152 |
| 6,243,621 B1 | * | 6/2001 | Tao et al. | 700/245 |
| 7,126,329 B2 | * | 10/2006 | Ruzzo et al. | 324/239 |
| 7,204,033 B2 | * | 4/2007 | Mies | 33/556 |
| 7,283,889 B2 | * | 10/2007 | Otsuki et al. | 700/186 |
| 7,340,323 B2 | * | 3/2008 | Zhang et al. | 700/260 |
| 7,448,271 B2 | * | 11/2008 | Duncan et al. | 73/634 |
| 2004/0254677 A1 | * | 12/2004 | Brogardh et al. | 700/245 |
| 2007/0050064 A1 | | 3/2007 | Burgess et al. | |
| 2008/0235970 A1 | * | 10/2008 | Crampton | 33/503 |
| 2009/0029631 A1 | * | 1/2009 | Offer et al. | 451/28 |
| 2010/0023157 A1 | * | 1/2010 | Burgess et al. | 700/186 |

FOREIGN PATENT DOCUMENTS

| | | |
|---|---|---|
| DE | 10131228 A1 | 3/2002 |
| EP | 1129813 A1 | 9/2001 |
| WO | 2006024844 A2 | 3/2006 |

OTHER PUBLICATIONS

U.S. Appl. No. 12/339,689, filed Dec. 19, 2008, Crothers et al.
PCT Search report for application PCT/2009/068836 dated Jun. 8, 2010.
PCT Search report for application PCT/2009/068696 dated Jun. 8, 2010.

(Continued)

*Primary Examiner* — Ramesh B Patel
(74) *Attorney, Agent, or Firm* — Yee & Associates, P.C.

(57) ABSTRACT

A method for conforming components may include a measuring operation and a modifying operation. The method may comprise measuring a first component using a conforming tool that includes a measuring member, and recording position data for the first component based on the measuring. A path for the conforming tool may be provided using the position data, and a second component may be modified with a modifying member by moving the same conforming tool based on the provided path. The measuring member may include a sleeve configured so as to surround the modifying member when measuring, and to be removed from the modifying member so as to allow the modifying operation.

42 Claims, 7 Drawing Sheets

OTHER PUBLICATIONS

USPTO office action for U.S. Appl. No. 12/339,689 dated Dec. 27, 2010.
Renishaw, "TS27R tool setting probe", 2002, pp. 1-2.
"DC motor driver H-bridge circuit", pp. 1-9, 2000 www.robotroom.com.
Marposs, "E88 touch system", pp. 1-4, 2000.

* cited by examiner

APPARATUS AND METHOD FOR MEASURING AND MODIFYING COMPONENTS USING REVERSE ENGINEERING

BACKGROUND INFORMATION

1. Field

The present disclosure relates generally to manufacturing conforming components and, in particular, to a method and apparatus for conforming first and second components by using a robot/machine to reverse engineer the first component and then using the same robot/machine to modify the second component to conform to the first component.

2. Background

The joining of major structural components of an aircraft, for example, a wing-to-body join, is a significant part of the total time required for final assembly of the aircraft. A total cycle time for the final assembly of an aircraft may, for example and without limitation, be three days, and a reduction in the time required for joining major structural components is desirable.

Major structural components of an aircraft are usually joined by positioning the components adjacent one another and then drilling holes through the components using a multistage drilling process. Multistage drilling ensures higher hole quality and minimal burrs in the components.

About 15 minutes may be required to drill each hole in a multistage drilling process, and hundreds of holes may be required to be drilled in order to join a wing to an aircraft body. Thus, the overall aircraft assembly process may be quite slow. Also, there is a significant potential of out of tolerance holes being created in a multistage drilling process, which may result in further delays.

A number of solutions have been proposed to expedite drilling operations for reducing the joining cycle time of aircraft components. Proposed solutions include drilling undersized holes in the two components to be joined, and then reaming the holes to full size when the components are joined. This proposed solution avoids a multistage drilling process and may reduce assembly time. The proposed solution, however, still requires a major drilling effort and the potential of out of tolerance holes remains.

In another proposed solution, the components to be joined are drilled to nominal dimensions, i.e., the dimensions are drawn without any reverse engineering. Tolerance requirements, however, are much tighter in this proposed solution. In particular, the tolerance requirements for each component is maximized because each component is drilled without updated information on the drilled hole location of the other component. When all aspects that could influence the final fit of the components are considered, the tolerance requirements may become prohibitive.

Another proposed solution is to reverse engineer a first component and then machine a second component to conform to the first component. The reverse engineering is performed via metrology, and may introduce a second set of uncertainties which are in addition to machine uncertainties.

Therefore, it would be advantageous to have a method and apparatus that overcomes the above issues in conforming components.

SUMMARY

In one advantageous embodiment, a method for conforming components may include measuring a first component using a conforming tool, and recording position data for the first component based on the measuring. A path for the conforming tool may be created using the position data, and a second component may be modified by moving the same conforming tool based on the created path.

In another advantageous embodiment, a method for conforming components may include measuring a first feature of a first component using a conforming tool, and recording position data for the first feature based on the measuring. A path for the conforming tool may be provided using the position data, and a second feature that conforms to the first feature on the first component may be formed on a second component by moving the same conforming tool based on the provided path.

In yet another advantageous embodiment, an apparatus for conforming components may include a conforming tool for measuring a first component, and a controller for providing a path for the conforming tool to modify a second component based on the measuring. The apparatus may further include a driver for moving the same conforming tool along the provided path for modifying the second component.

In yet another advantageous embodiment, a computer program product may include a computer recordable medium storing computer usable program code for conforming components. The computer program product may also include computer usable program code for measuring a first component using a conforming tool, and computer usable program code for recording position data for the first component based on the measuring. The computer program product may also include computer usable program code for providing a path for the conforming tool using the measured position data, and computer usable program code for modifying a second component by moving the same conforming tool based on the provided path.

In yet another advantageous embodiment, a method for conforming holes on aircraft components may include measuring a first hole of a first aircraft component with a measuring member attached to an arm of a robot, and recording position data for the first hole based on the measuring. A map of the first hole may be provided from the recorded position data, a CAD file may be modified using the map, a numerically controlled path may be created for the robot based on the CAD file, and the numerically controlled path may be downloaded to the robot. The measuring member may be removed from the arm of the robot to expose a drill also attached to the arm of the robot, and a second hole may be drilled on a second aircraft component that conforms to the first hole on the first aircraft component by moving the drill also attached to the arm of the robot based on the downloaded numerically controlled path.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
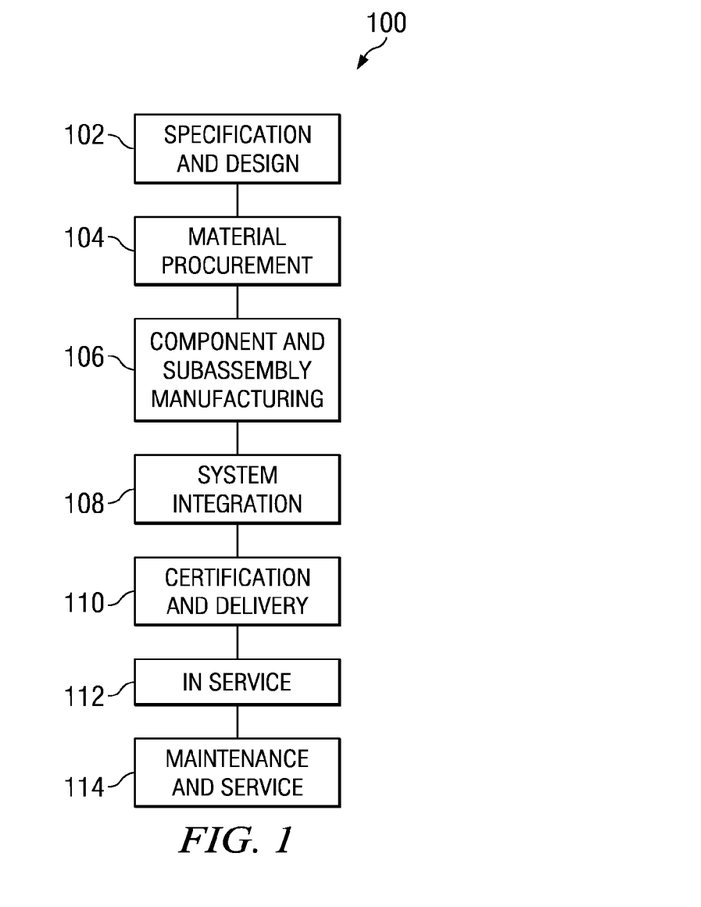
FIG. 1 is a diagram illustrating an aircraft manufacturing and service method in which an advantageous embodiment may be implemented.
Figure 2:
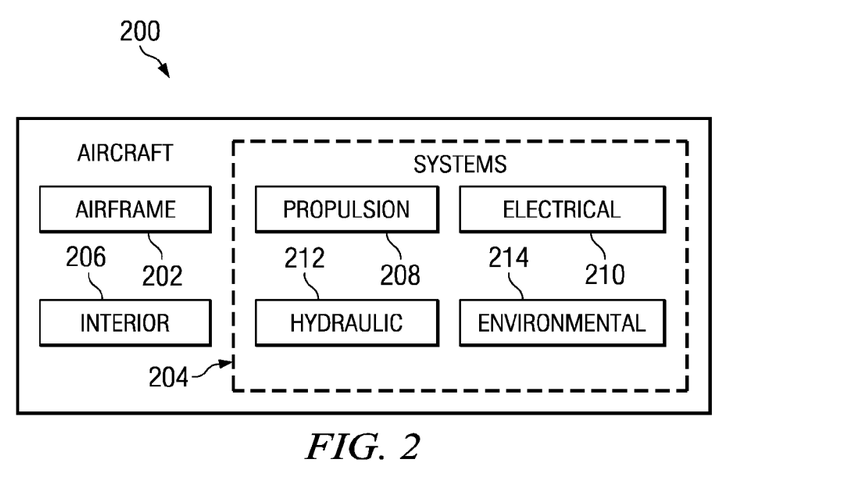
FIG. 2 is a diagram of an aircraft in accordance with an advantageous embodiment.

Referring more particularly to the drawings, embodiments of the disclosure may be described in the context of aircraft manufacturing and service method 100 as shown in FIG. 1 and an aircraft 200 as shown in FIG. 2. During pre-production, aircraft manufacturing and service method 100 may include specification and design 102 of aircraft 200 and material procurement 104.

During production, component and subassembly manufacturing 106 and system integration 108 of aircraft 200 takes place. Thereafter, aircraft 200 may go through certification and delivery 110 in order to be placed in service 112. While in service by a customer, aircraft 200 is scheduled for routine maintenance and service 114 (which may also include modification, reconfiguration, refurbishment, and so on).

Each of the processes of aircraft manufacturing and service method 100 may be performed or carried out by a system integrator, a third party, and/or an operator (e.g., a customer). For the purposes of this description, a system integrator may include, without limitation, any number of aircraft manufacturers and major system subcontractors; a third party may include, for example, without limitation, any number of vendors, subcontractors, and suppliers; and an operator may be an airline, leasing company, military entity, service organization, and so on.

As shown in FIG. 2, aircraft 200 produced by aircraft manufacturing and service method 100 may include airframe 202 with a plurality of systems 204 and interior 206. Examples of systems 204 include one or more of propulsion system 208, electrical system 210, hydraulic system 212, and environmental system 214. Any number of other systems may be included in this example. Although an aerospace example is shown, the principles of the disclosure may be applied to other industries, such as the automotive industry.

Apparatus and methods embodied herein may be employed during any one or more of the stages of aircraft manufacturing and service method 100. For example, without limitation, components or subassemblies corresponding to component and subassembly manufacturing 106 may be fabricated or manufactured in a manner similar to components or subassemblies produced while aircraft 200 is in service. Also, one or more apparatus embodiments, method embodiments, or a combination thereof may be utilized during component and subassembly manufacturing 106 and system integration 108, for example, without limitation, by substantially expediting assembly of or reducing the cost of aircraft 200. As a specific example, an advantageous embodiment may be implemented during component and subassembly manufacturing 106 and system integration 108 to join aircraft components.

Advantageous embodiments provide a method and apparatus for conforming components, for example, aircraft components to be joined when assembling an aircraft. The different advantageous embodiments recognize that out of tolerance conditions may be minimized when conforming first and second components by using the same tool to both measure the first component and to modify the second component to conform to the first component. Out of tolerance conditions may be minimized because the tool configuration during the modifying of the second component will be similar to the tool configuration during the measuring of the first component. If measurement of the first component is performed by a different tool than the tool that modifies the second component, out of tolerance conditions may be larger because the separate tools will have different uncertainty characteristics. By using the same machine for both reverse engineering the first component and modifying the second component, out of tolerance conditions are reduced, and the overall time required to join the first component to the second component may be reduced.

The different advantageous embodiments recognize and take into account the use of force control to allow the minimization of out of tolerance conditions in modifying a second component to conform to a first component. In particular, force control is used to achieve a steady and consistent contact force against the first component being measured by a conforming tool as the conforming tool is moved on the first component for reverse engineering the first component, and then the reverse engineering is used to create an advantageous path for modification of the second component by the same tool that performed the measuring to conform the second component to the first component.

Figure 3:
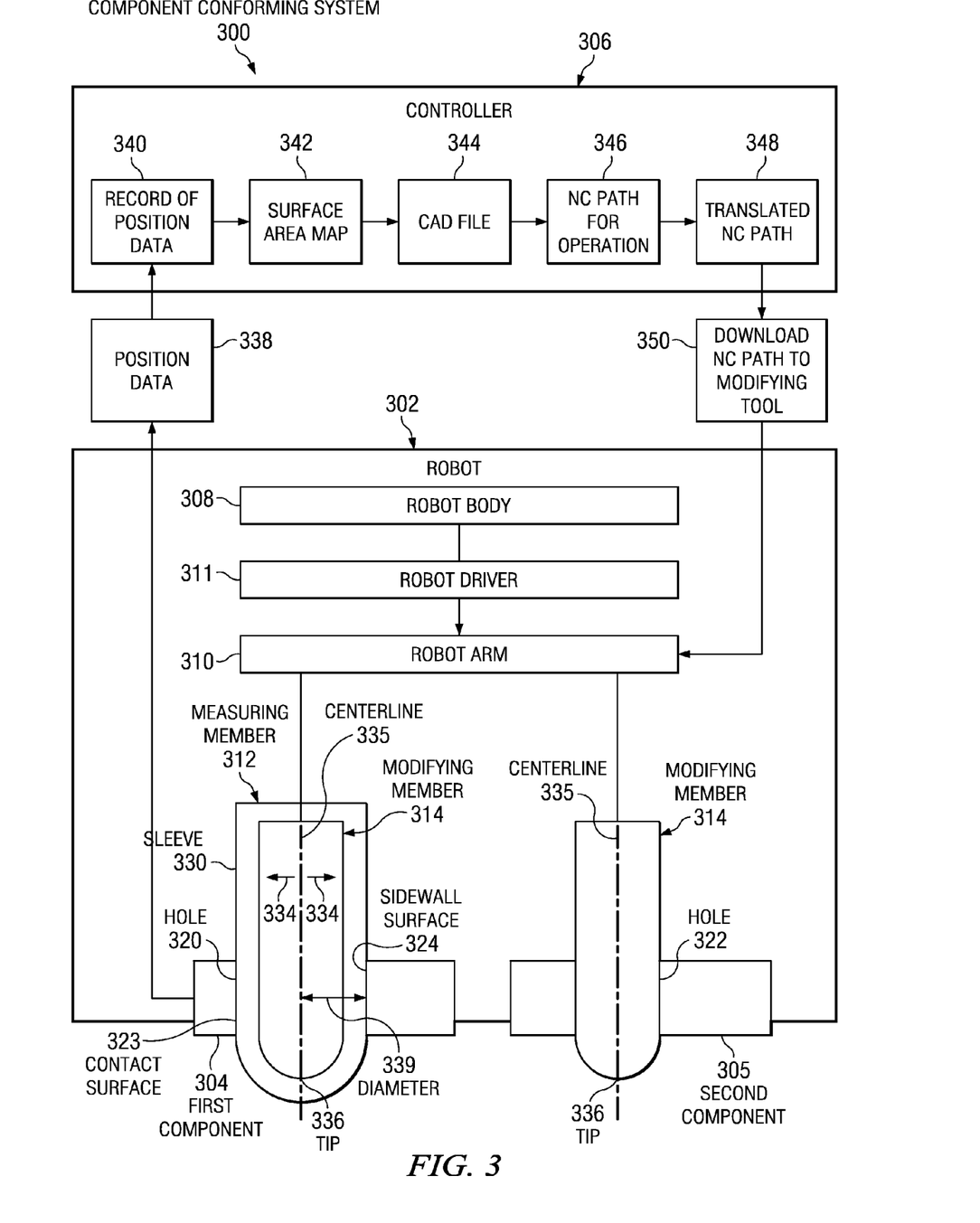
FIG. 3 is a block diagram illustrating a component conforming system in accordance with an advantageous embodiment.

With reference now to FIG. 3, a block diagram illustrating a component conforming system is depicted in accordance with an advantageous embodiment. In this example, the component conforming system is designated by reference number 300, and generally includes a conforming tool 302 for measuring a first component such as component 304, and for modifying a second component such as component 305, to conform the second component 305 to the first component 304, and a controller 306 for controlling the operation of conforming tool 302. In the advantageous embodiment illustrated in FIG. 3, conforming tool 302 is implemented as robot 302. In other advantageous embodiments, the conforming tool may be implemented as a machine tool or a parallel kinematic machine.

Robot 302 includes robot body 308 supporting robot arm 310. Robot arm 310 functions as an automated manipulator and is capable of movement along multiple axes, for example, five or six axes, via a motion driver 311, and carries measuring member 312 and modifying member 314 at an outer end thereof.

Modifying member 314 may be any appropriate tool for performing a desired modifying operation on second component 305. In one advantageous embodiment, modifying member 314 may be implemented as a drill for drilling a hole 322 into or through the second component 305. According to other advantageous embodiments, modifying member 314 may be a tool for performing other types of modifications to second component 305 to conform the second component to the first component 304.

Measuring member 312 may measure a current location and/or profile of a feature of first component 304 using force control. In particular, robot arm 310 is controlled via robot driver 311 to move measuring member 312 over a first feature 320 of first component 304 being measured with a contact force that is maintained steady and consistent during measuring regardless of the position of the measuring tool with respect to the first feature 320 of the first component 304. According to an advantageous embodiment of the disclosure, first feature 320 comprises a hole 320 and measuring member 312 comprises a removably mounted sleeve 330 surrounding modifying member 314. Sleeve 330 may be sized to extend into and fit snugly within hole 320 such that a contact surface 323 of sleeve 330 may be maintained in contact with sidewall surface 324 of hole 320 to measure the surface geometry of sidewall surface 324 via force control, in a force direction generally designated by arrows 334, giving hole location and orientation. In another advantageous embodiment, measuring member may be a solid piece that replaces the measuring member.

As robot arm 310 is moved by robot driver 311 to cause sleeve 330 to follow the surface profile of sidewall surface 324 of first component 304, with contact surface 323 of sleeve 330 in force contact with the sidewall surface 324 via force control 334, the path followed by the sleeve may be detected by the measuring member 312. In particular, position data 338 representing the position of the sleeve 330 may measured as the sleeve 330 is moved in hole 320 in first component 304, and the position data 338 is recorded in controller 306 to form position data record 340. A map 342 of the sidewall surface 324 of hole 320 may then be created from the position data, and the map is used to modify a CAD file 344 to allow for a desired numerically controlled (NC) path 346 to be created for operating the modifying member to modify the second component 305 to conform to the first component 304. The NC path may be translated into machine language as shown at 348. The translated NC path may then be downloaded to the robot arm as shown at 350 to control the movement of the robot arm 310 and, hence, to control the movement of modifying member 314 via robot driver 311.

The contact surface 323 of sleeve 330 is at a fixed position relative to the centerline (axis) 335 of the modifying member 314. Thus, the contact surface 323 on the measuring member may always be related back to the modifying member that is adapted to modify the second component 306. In the advantageous embodiment in which modifying member comprises a drill, contact surface 323 on measuring member 312 may always be related back to the drill tip 336 and centerline (axis) 335 of the drill.

During a measuring operation, the sleeve 330 may extend fully into the hole 320 in the first component 304. Sleeve 330 may have a shape that will match the anticipated inner shape of the hole 320. In this regard, if hole 320 is formed with a countersink, the sleeve 330 may have the same countersink geometry.

Sleeve 330 is sized to fit into hole 320 with a snug fit such that force control may be used to precisely perform this fit. As a result, the orientation and location of hole 320 in the first component 304 may accurately measured.

Following a measuring operation, robot arm 310 is positioned relative to the second component 305 and the sleeve 330 is removed to expose modifying member 314 or, alternatively, the measuring member may be removed and replaced by the modifying member. According to advantageous embodiments, positioning of the robot arm relative to the second component may be achieved by replacing the first component with the second component or by moving robot 302 to be adjacent to or on the second component 305. Following positioning of the robot with respect to the second component, modifying member 314 is operated to form hole 322 in the second component 305, for example and without limitation, by drilling hole 322 in second component 305. As indicated above, the translated NC path that was downloaded to the robot arm 310 as shown at 350 may be used to control the movement of the robot arm 310 and, hence, to control the movement of modifying member 314 via robot driver 311 to form the hole.

Figure 4:
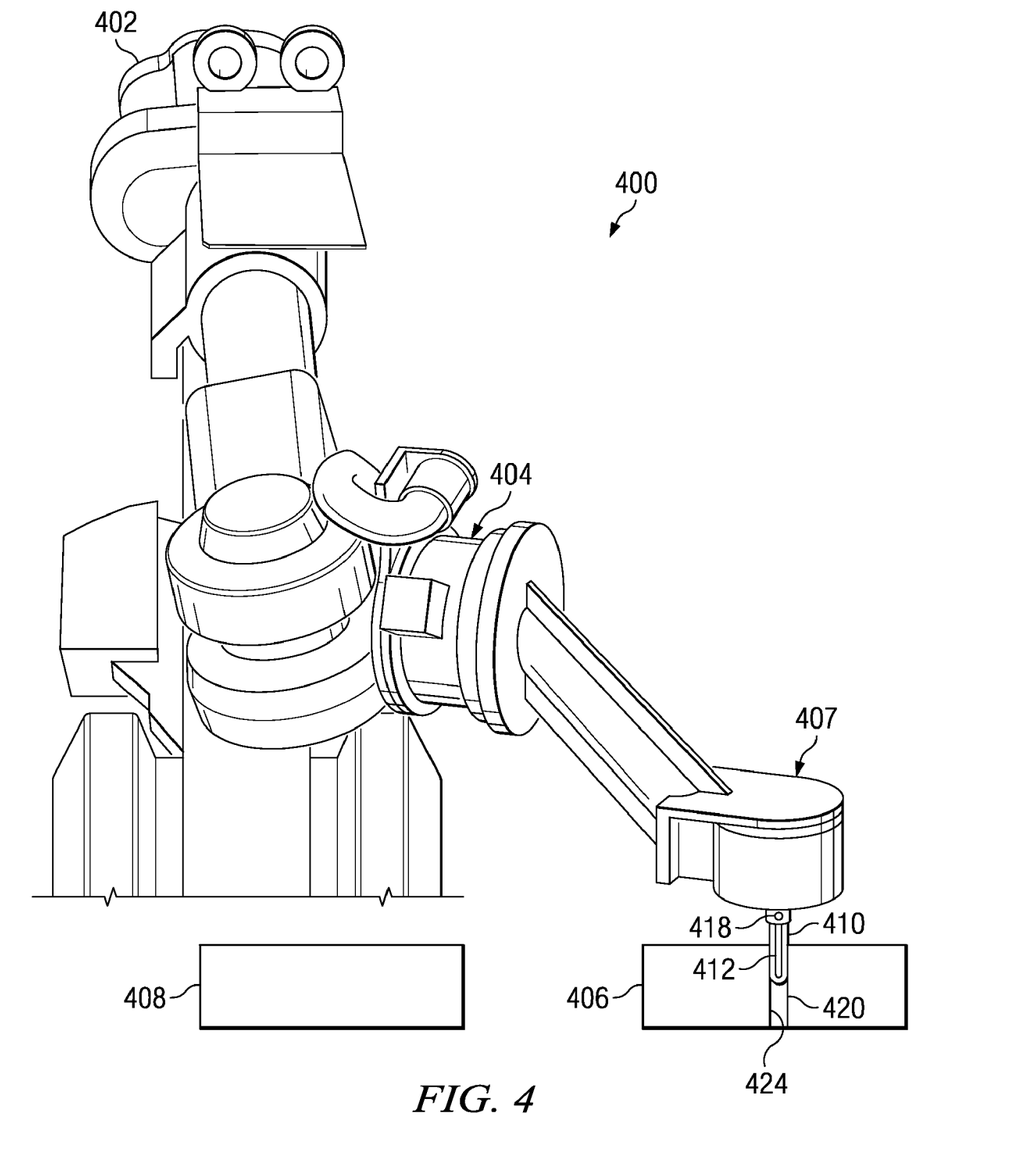
FIG. 4 is a diagram illustrating a conforming tool in accordance with an advantageous embodiment.

With reference now to FIG. 4, a diagram illustrating a conforming tool is depicted in accordance with an advantageous embodiment. In this example, conforming tool 400 is implemented as robot 400 and is an example of one implementation of robot 302 in FIG. 3. In this example, robot 400 includes robot body 402, and robot arm 404. Robot 400 may be a free-standing structure that may be positioned adjacent a first component 406 to be measured and adjacent to a second component 408 to be modified, or robot body 402 may be mounted directly to the component via suction cups, straps, or another mounting mechanism. First component 406 is an example of one implementation of first component 304 in FIG. 3, and second component 408 is an example of one implementation of second component 305 in FIG. 3.

FIG. 4 illustrates a measuring member 410 and a modifying member 412 mounted to end 407 of robot arm 404. Measuring member 410 is an example of one implementation of measuring member 312 in FIG. 3, and modifying member 412 is an example of one implementation of modifying member 314 in FIG. 3. According to the advantageous embodiment illustrated in FIG. 4, measuring member 410 is adapted to be removably attached to end 407 of robot arm 404 during a measuring process on first component 406 by, for example, a grub screw 418 which clamps the side of the measuring member, or by another attachment mechanism, and then removed to expose modifying member 412 for a modifying process on second component 408. According to another advantageous embodiment, the measuring member may be removed and replaced with the modifying member. FIG. 4 illustrates robot arm 404 positioned to cause measuring member 410 to extend into a hole 420 of first component 406 during a measuring process.

In an advantageous embodiment, first and second components 406 and 408 comprise first and second components to be conformed to one another, and the measuring member 410 comprises a sleeve for measuring the sidewall surface 424 of hole 420 in the first component 406, and the modifying member 412 comprises a drill for drilling a hole in the second component 408 that conforms to hole 420 in the first component 406 so that the components may, for example and without limitation, be properly joined together. In other advantageous embodiments, modifying member 412 can be any kind of tool for forming a feature on the second component to conform to a feature on the first component.

Figure 5A:
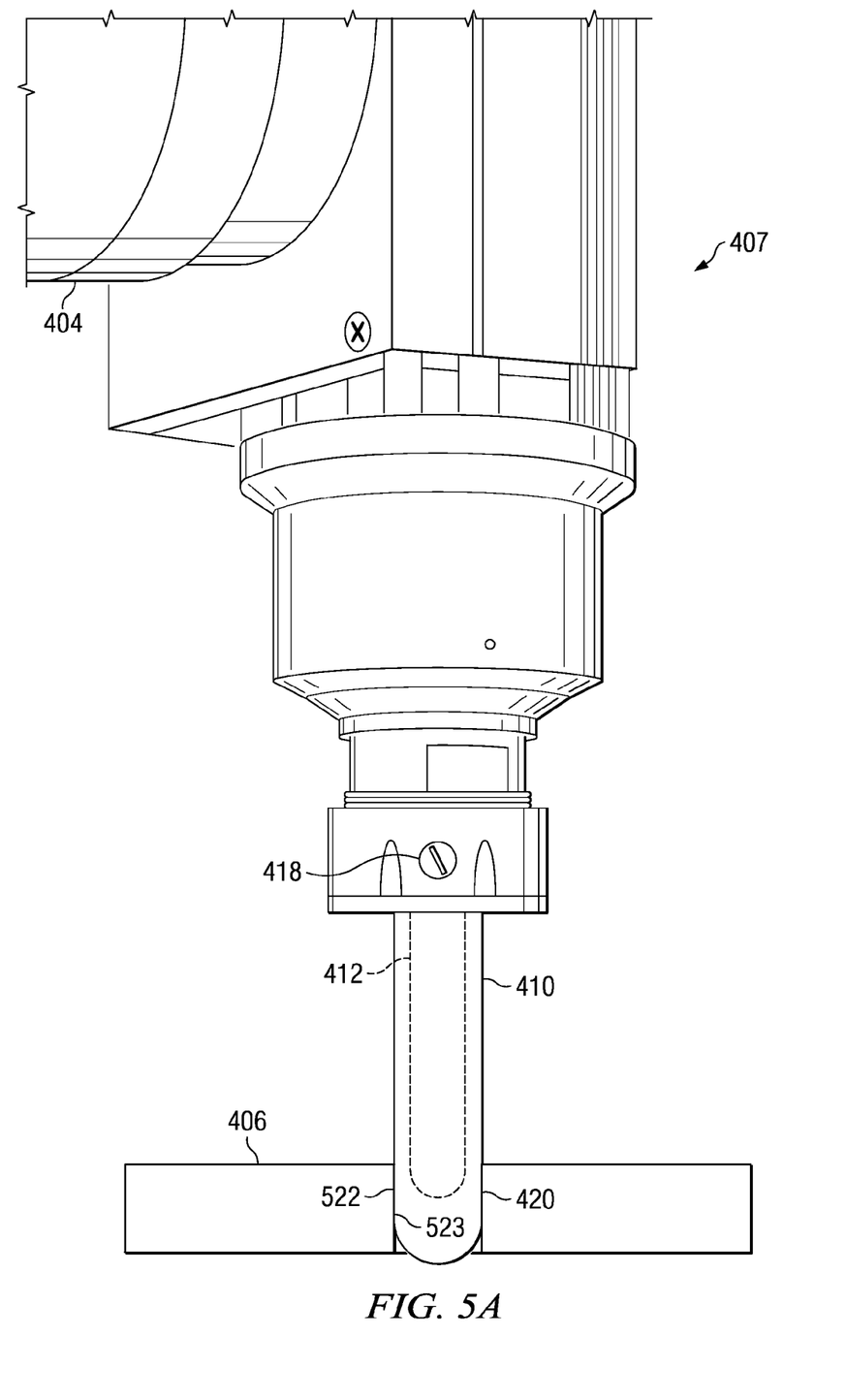
FIG. 5A is a diagram illustrating a measuring member in accordance with an advantageous embodiment.
Figure 5B:
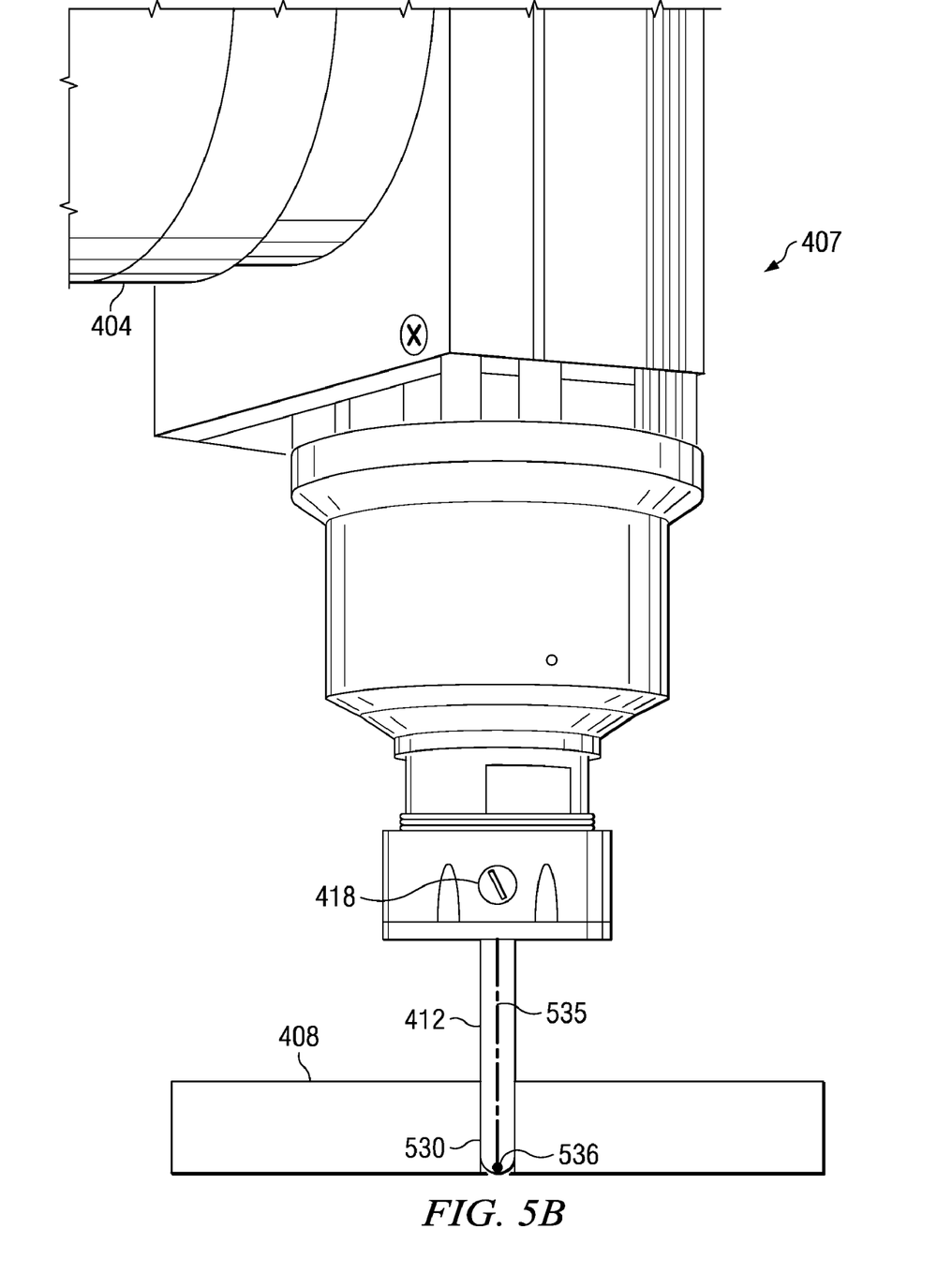
FIG. 5B is a diagram illustrating a modifying member in accordance with an advantageous embodiment.

Turning now to FIGS. 5A and 5B, FIG. 5A is a diagram illustrating a measuring member in accordance with an advantageous embodiment, and FIG. 5B is a diagram illustrating a modifying member in accordance with an advantageous embodiment. In particular, FIG. 5A is an enlarged view of the end 407 of robot arm 404 in FIG. 4, and FIG. 5B is an enlarged view of the end 407 of robot arm 404 with the measuring member 410 removed so as to expose modifying member 412 for a modifying process.

As shown in FIG. 5A, measuring member 410 comprises a sleeve that surrounds modifying member 412 when attached to the end 407 of the robot arm. Sleeve 410 has a contact surface 522 that is adapted to be in force contact with a sidewall surface 523 of first component 406 during a measurement process.

Sleeve 410 may be formed of metal or another material selected so as not to mar and/or scratch the surface being measured and to maintain its shape. The amount of force used to measure the sidewall surface 523 should be less than will mar, deform and/or scratch the first component, but sufficient to ensure that contact is maintained with the sidewall surface 523 during a measuring process, i.e., no bouncing or drifting from the surface due to the force being too small. According to an advantageous embodiment, the amount of force used to measure the sidewall surface 523 of the first component 406 may be from about 5 to about 20 Newtons, depending on the sensitivity and capacity of the force sensing engaged.

After a measuring process has been completed, the measuring member 410 may be removed to expose modifying member 412 for a machining process as illustrated in FIG. 5B. The robot arm 404 may then be operated to move modifying member 412 with respect to second component 408 to modify the second component 408 (i.e. form hole 320). Because the centerline (axis) 535 of the modifying member 412 and the contact tip 536 of the modifying member on axis 535 can be related to the contact surface 522 of the measuring member 410, the measurements made by the measuring member 410 can be used to design a path for the modifying member 412 to properly modify the second component 408. In this regard, either the robot or the components may be moved to position the robot arm 404 relative to the second component. Accurate indexing of the positions of the robot relative to each component during each phase must be maintained to ensure that the machined feature in the second component will conform to the feature in the first component. In this regard, it may also be desirable to position the first and second components to be similar relative to the robot.

Figure 6:
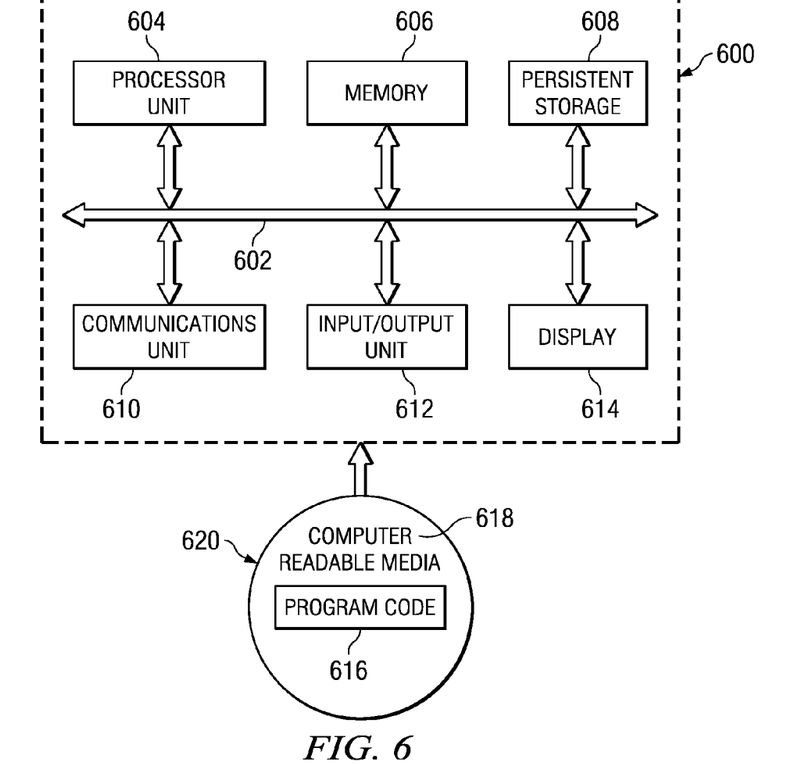
FIG. 6 is a diagram of a controller in accordance with an advantageous embodiment.

Turning now to FIG. 6, a diagram of a controller is depicted in accordance with an advantageous embodiment. In this example, controller 600 is an example of one implementation of controller 308 in FIG. 3. In this illustrative example, controller 600 includes communications fabric 602, which provides communications between processor unit 604, memory 606, persistent storage 608, communications unit 610, input/output (I/O) unit 612, and display 614.

Processor unit 604 serves to execute instructions for software that may be loaded into memory 606. Processor unit 604 may be a set of one or more processors or may be a multi-processor core, depending on the particular implementation.

Memory 606 and persistent storage 608 are examples of storage devices. A storage device is any piece of hardware that is capable of storing information either on a temporary basis and/or a permanent basis. Memory 606, in these examples, may be, for example, a random access memory or any other suitable volatile or non-volatile storage device. Persistent storage 608 may take various forms depending on the particular implementation.

For example, persistent storage 608 may contain one or more components or devices. For example, persistent storage 608 may be a hard drive, a flash memory, a rewritable optical disk, a rewritable magnetic tape, or some combination of the above. The media used by persistent storage 608 also may be removable. For example, a removable hard drive may be used for persistent storage 608.

Communications unit 610, in these examples, provides for communications with other data processing systems or devices. In these examples, communications unit 610 is a network interface card. Communications unit 610 may provide communications through the use of either or both physical and wireless communications links.

Input/output unit 612 allows for input and output of data with other devices that may be connected to controller 600. For example, input/output unit 612 may provide a connection for user input through a keyboard and mouse. Further, input/output unit 612 may send output to a printer. Display 614 provides a mechanism to display information to a user.

Instructions for the operating system and applications or programs are located on persistent storage 608. These instructions may be loaded into memory 606 for execution by processor unit 604. The processes of the different embodiments may be performed by processor unit 604 using computer implemented instructions, which may be located in a memory, such as memory 606. These instructions are referred to as program code, computer usable program code, or computer readable program code that may be read and executed by a processor in processor unit 604. The program code in the different embodiments may be embodied on different physical or tangible computer readable media, such as memory 606 or persistent storage 608.

Program code 616 is located in a functional form on computer readable media 618 that is selectively removable and may be loaded onto or transferred to controller 600 for execution by processor unit 604. In these examples, program code 616 is an example of software which may be used create surface area map 342, CAD file 344, NC path 346 and translated NC path 348 in FIG. 3.

Program code 616 and computer readable media 618 form computer program product 620 in these examples. In one example, computer readable media 618 may be in a tangible form, such as, for example, an optical or magnetic disc that is inserted or placed into a drive or other device that is part of persistent storage 608 for transfer onto a storage device, such as a hard drive that is part of persistent storage 608.

In a tangible form, computer readable media 618 also may take the form of a persistent storage, such as a hard drive, a thumb drive, or a flash memory that is connected to controller 600. The tangible form of computer readable media 618 is also referred to as computer recordable storage media. In some instances, computer readable media 618 may not be removable.

Alternatively, program code 616 may be transferred to controller 600 from computer readable media 618 through a communications link to communications unit 610 and/or through a connection to input/output unit 612. The communications link and/or the connection may be physical or wireless in the illustrative examples. The computer readable media also may take the form of non-tangible media, such as communications links or wireless transmissions containing the program code.

Figure 7:
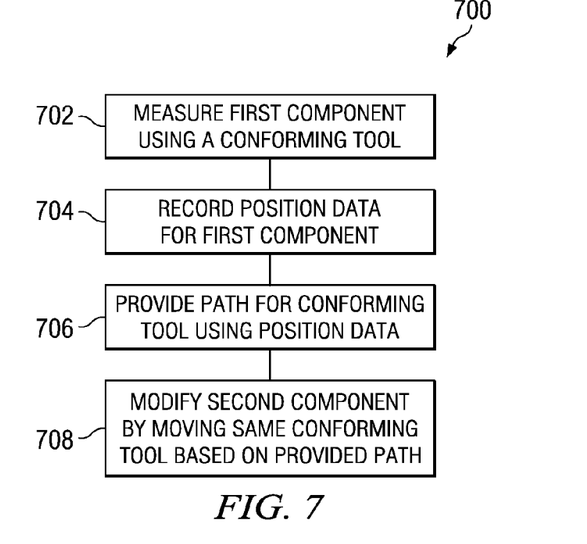
FIG. 7 is a flowchart of a process for conforming components in accordance with an advantageous embodiment.

With reference now to FIG. 7, a flowchart of a process for conforming components is depicted in accordance with an advantageous embodiment. The process is generally designated by reference number 700, and may begin by measuring a first component using a conforming tool (operation 702). Position data for the first component may be recorded based on the measuring (operation 704), and a path for the tool may be provided using the position data, for example and without limitation, by creating a numerically controlled path for the tool (operation 706). A second component may be modified by moving the same tool based on the provided path (operation 708).

Figure 8:
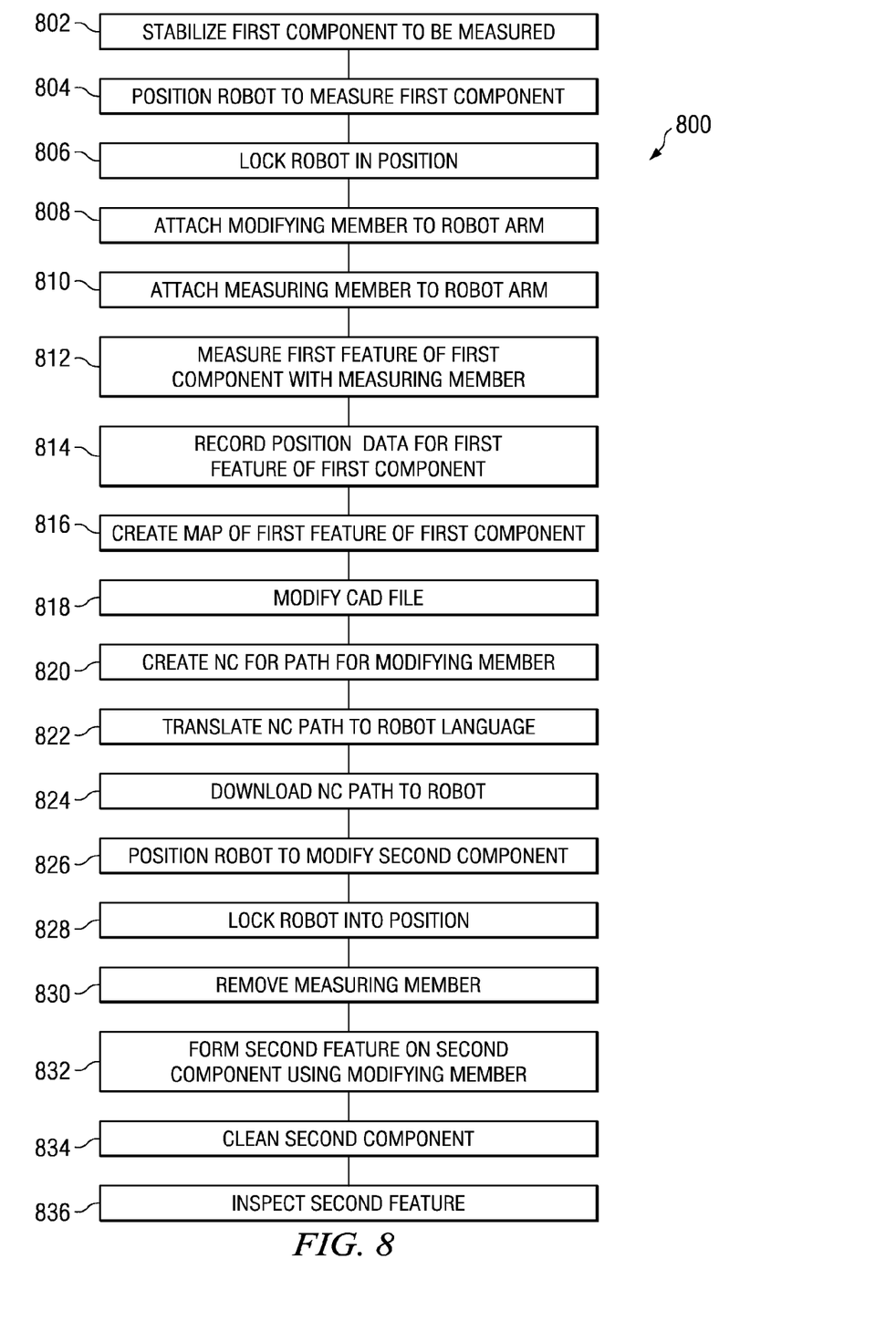
FIG. 8 is a flowchart of a process for conforming first and second components in accordance with an advantageous embodiment.

With reference now to FIG. 8, a flowchart of a process for conforming first and second components is depicted in accordance with an advantageous embodiment. The process is generally designated by reference number 800, and, in the advantageous embodiment illustrated in FIG. 8, may be a process for drilling a second hole in a second component, for example and without limitation, a second aircraft component, to conform to a first hole in a first component, for example and without limitation, a first aircraft component. Process 800 may begin by stabilizing a first component to be measured, for example and without limitation, first component 304 in FIG. 3 or first component 406 in FIGS. 4 and 5A (operation 802). Stabilization may be accomplished, for example, by mounting the first component so as to minimize flexure movement and vibration of the first component.

A conforming tool may then be positioned to measure the first component (operation 804). In one advantageous embodiment, the conforming tool may be a robot, for example and without limitation, robot 302 in FIG. 3 or robot 400 in FIG. 4, and the positioning may position the robot adjacent to or on the first component to be measured to ensure full access of the robot to a feature of the first component to be measured, for example and without limitation, hole 320 in FIG. 3 or hole 420 in FIGS. 4 and 5A. The robot 302 or 400 may then be locked in position with respect to the first component 304 or 406 to be measured to prevent relative movement between the robot 302 or 400 and the first component 304 or 406 (operation 806). For example, the robot may be locked in a self-supported position adjacent to the first component or it may be mounted directly to the first component by suction cups or other mounting mechanisms.

A modifying member, for example and without limitation, modifying member 314 in FIG. 3 or modifying member 412 in FIGS. 4, 5A and 5B, may then be attached to an arm of the robot, for example and without limitation, robot arm 310 in FIG. 3 or robot arm 404 in FIGS. 4, 5A and 5B (operation 808), and a measuring member, for example and without limitation, measuring member 312 in FIG. 3 or measuring member 410 in FIGS. 4 and 5A, may also be mounted to the robot arm 310 or 404 (operation 810). In one advantageous embodiment, the measuring member may comprise a measuring sleeve, for example and without limitation, sleeve 330 in FIG. 3, mounted to surround the modifying member during a measuring process, and then removed to expose the modifying member for a modifying process. In an advantageous embodiment, the sleeve has a contact surface, for example and without limitation, contact surface 323 in FIG. 3 and contact surface 422 in FIG. 5A, and may be mounted to the robot arm 404 in such a manner that the contact surface 323 or 422 of the sleeve 330 is related to an axis system such as the TCP, for example and without limitation, axis 335 in FIG. 3 and axis 535 in FIGS. 4 and 5A, and a contact tip of the modifying tool, for example and without limitation, contact tip 336 in FIG. 3 and contact tip 536 in FIG. 5B.

A feature of the first component to be measured may then be measured with the measuring member using force controlled motion of the measuring member (operation 812). As the measuring member is moved over a first feature of the first component, for example and without limitation, hole 322 in FIG. 3 and hole 420 in FIGS. 4 and 5A, position data for the feature, for example and without limitation, position data 338 in FIG. 3, is recorded (operation 814). A map, for example and without limitation, map 342 in FIG. 3, of the feature being measured may be created using the position data (operation 816), and the map may be used to modify a CAD file, for example and without limitation, CAD file 344 in FIG. 3, based on the map (operation 818). A numerically controlled (NC) path for the machining tool, for example and without limitation, NC path 346 in FIG. 3, may then be created (operation 820), the created NC path may be translated to machine language, for example and without limitation, translated NC path 348 in FIG. 3 (operation 822), and the translated NC path may be downloaded to the robot, for example and without limitation, downloaded NC path 350 in FIG. 3 (operation 824).

The robot may then be positioned relative to a second component to be modified, for example and without limitation, second component 305 in FIG. 3 or second component 408 in FIGS. 4 and 5B (operation 826). According to advantageous embodiments, the positioning may be accomplished by moving the robot from the position adjacent to or on the first component to a position adjacent to or on the second component, or by replacing the first component with the second component. Irrespective, the positioning is such that the relative position of the second component and the robot will be similar to the relative position of the first component and the robot during the measuring operation. The robot is then locked into position relative to the second component (operation 828).

The measuring member may then be removed from the robot arm to expose the machining member (operation 830), and the second component may be modified by moving the modifying member on the second component based on the downloaded NC path to form a second feature on the second component (operation 832). For example and without limitation, the modifying member may be a drill and the modifying operation may be drilling a second hole in the second component to conform to the first hole in the first component. In another advantageous embodiment, the modifying member may be a milling bit and the modifying operation may be surface machining a surface of the second component to conform to the first component surface.

Following the modifying of the second component, the second component may be cleaned (operation 834) and inspected (operation 836) so that subsequent operations may be performed on the conformed components, for example and without limitation, joining the first and second components by extending a fastener through the first and second holes. The surfaces will also be conforming, reducing or eliminating the need for shimming.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for conforming components, comprising:
   measuring a first component with a measuring member attached to an arm of a conforming tool;
   recording position data for the first component based on the measuring;
   providing a path for the conforming tool using the position data;
   exposing a modifying member attached to the arm of the same conforming tool; and
   modifying a second component by moving the modifying member attached to the arm of the same conforming tool based on the provided path.

2. The method according to claim 1, wherein measuring the first component using a conforming tool comprises:
   measuring the first component using force controlled motion of the conforming tool.

3. The method according to claim 1, wherein providing a path for the conforming tool using the position data, comprises:
   providing a map of the first component from the recorded position data;
   modifying a CAD file using the map; and
   creating a numerically controlled path for the conforming tool based on the CAD file.

4. The method according to claim 3, and further comprising:

downloading the numerically controlled path to the conforming tool, wherein modifying the second component by moving the same conforming tool based on the provided path, comprises:
  modifying the second component by moving the same conforming tool based on the downloaded numerically controlled path.

5. The method according to claim 1, wherein the conforming tool comprises one of a robot, a machining tool or a parallel kinematic machine.

6. The method according to claim 5, wherein measuring the first component using a conforming tool, comprises:
  measuring a first feature of the first component with a measuring member attached to an arm of the robot, and wherein modifying the second component comprises forming a second feature on the second component with the modifying member also attached to the arm of the robot.

7. The method according to claim 6, wherein the first feature comprise a first hole in the first component, and wherein measuring a first feature of the first component with a measuring member attached to an arm of the robot comprises measuring a sidewall surface of the first hole, and wherein forming a second feature on the second component with a modifying member also attached to the arm of the robot, comprises forming a second hole in the second component.

8. The method according to claim 7, wherein the modifying member comprises a drill.

9. The method according to claim 8, wherein the measuring member surrounds the drill during the measuring, and further comprising removing the measuring member following the measuring.

10. The method according to claim 9, and further comprising positioning a contact surface of the measuring member at a fixed position with respect to a drill axis of the drill when the measuring member surrounds the drill.

11. The method according to claim 7, wherein the modifying member comprises a milling bit.

12. The method according to claim 1, wherein the first and second components comprise first and second aircraft components.

13. A method for conforming components, comprising:
  measuring a first feature of a first component using a conforming tool, the conforming tool comprising a measuring member and a modifying member;
  recording position data for the first feature based on the measuring;
  providing a path for the conforming tool using the position data;
  exposing the modifying member; and
  forming with the modifying member a second feature on a second component that conforms to the first feature on the first component by moving the same conforming tool based on the provided path.

14. The method according to claim 13, wherein measuring a first feature of a first component using a conforming tool comprises:
  measuring the first feature of the first component using force controlled motion of the conforming tool.

15. The method according to claim 13, wherein providing a path for the conforming tool using the position data, comprises:
  providing a map of the first feature from the recorded position data;
  modifying a CAD file using the map;
  creating a numerically controlled path for the conforming tool based on the CAD file; and
  downloading the numerically controlled path to the conforming tool, and wherein forming the second feature on the second component by moving the same conforming tool based on the provided path, comprises forming the second feature on the second component by moving the same conforming tool based on the downloaded numerically controlled path.

16. The method according to claim 13, wherein the first feature comprises a first hole, and wherein forming a second feature on a second component that conforms to the first feature on the first component by moving the same conforming tool based on the provided path comprises forming a second hole in the second component.

17. The method according to claim 16, wherein forming a second hole in the second component comprises drilling the second hole in the second component.

18. The method according to claim 16, wherein the first and second components comprise aircraft components to be joined.

19. The method according to claim 13, wherein the first feature comprises a surface feature, and wherein forming a second feature on a second component that conforms to the first feature on the first component by moving the same conforming tool based on the provided path comprises forming a second surface feature on the second component.

20. An apparatus for conforming components, the apparatus comprising:
  a conforming tool for measuring a first component, the conforming tool comprising a measuring member and a modifying member, the measuring member configured to surround the modifying member during measuring of the first component, and wherein the measuring member is removed from the modifying member during modifying of a second component by the modifying member;
  a controller for providing a path for the conforming tool to modify the second component based on the measuring; and
  a driver for moving the same conforming tool along the provided path for modifying the second component.

21. The apparatus according to claim 20, wherein the conforming tool comprises a robot, and wherein the measuring member and the modifying member are attached to a robot arm.

22. The apparatus according to claim 21, wherein the measuring member comprises a sleeve that is attached to the robot arm to surround the modifying member during measuring the first component, and wherein the measuring member is removed from the robot arm to expose the modifying member during modifying the second component.

23. The apparatus according to claim 22, wherein the measuring member measures a first hole in the first component, and wherein the modifying member comprises a drill for drilling a second hole in the second component, and wherein a contact surface of the measuring member is positioned at a fixed position with respect to a drill axis of the drill.

24. The apparatus according to claim 20, wherein the first and second components comprise aircraft components.

25. A computer program product, comprising:
  a non-transitory computer recordable medium storing computer usable program code executed by a processor for conforming components, the computer program product comprising:
  computer usable program code for measuring a first component using a conforming tool, the conforming tool comprising a measuring member and a modifying member, the measuring member configured to surround the modifying member during measuring of the first component, and wherein the measuring member is removed from the modifying member during modifying of a second component by the modifying member;
  computer usable program code for recording position data for the first component based on the measuring;

computer usable program code for providing a path for the conforming tool using the position data; and computer usable program code for modifying a second component by moving the same conforming tool based on the provided path.

26. The computer program product according to claim 25, wherein the computer usable program code for measuring the first component using a conforming tool comprises:

computer usable program code for measuring the first component using force controlled motion of the conforming tool.

27. The computer program product according to claim 25, wherein the computer usable program code for providing a path for the conforming tool using the position data, comprises:

computer usable program code for providing a map of the component from the recorded position data;

computer usable program code for modifying a CAD file using the map; and computer usable program code for creating a numerically controlled path for the conforming tool based on the CAD file.

28. The computer program product according to claim 25, wherein the computer usable program code for measuring the first component using a conforming tool, comprises:

computer usable program code for measuring a first feature of the first component with the measuring member attached to an arm of a robot, and wherein the computer usable program code for modifying the second component using the same conforming tool based on the provided path, comprises computer usable program code for forming a second feature on the second component with the modifying member also attached to the arm of the robot.

29. The computer program product according to claim 28, wherein the first feature comprise a first hole in the first component, and wherein the computer usable program code for forming a second feature on the second component with a modifying member also attached to the arm of the robot comprises computer usable program code for drilling a second hole in the second component.

30. A method for conforming holes on aircraft components, comprising:

measuring a first hole of a first aircraft component with a measuring member attached to an arm of a robot;

recording position data for the first hole based on the measuring;

providing a map of the first hole from the recorded position data;

modifying a CAD file using the map;

creating a numerically controlled path for the robot based on the CAD file; and downloading the numerically controlled path to the robot; exposing a drill also attached to the arm of the robot; and drilling a second hole on a second aircraft component that conforms to the first hole on the first aircraft component by moving the drill also attached to the arm of the robot based on the downloaded numerically controlled path.

31. An apparatus for conforming a first component with a second component, comprising:

a conforming tool comprising a measuring member and a modifying member;

the measuring member configured to measure the first component;

a controller configured to record position data for the first component based on the measuring by the measuring member;

the measuring member surrounds the modifying member during measuring of the first component by the measuring member, and the modifying member is exposed during modifying of the second component by the modifying member; and a driver configured to position and move the modifying member with respect to the second component such that the modifying member modifies the second component so as to conform to the first component.

32. The apparatus of claim 31, wherein the conforming tool comprises a robot arm, and wherein the measuring member and the modifying member are attached to a robot arm.

33. The apparatus of claim 32, wherein the robot arm is configured to lock into position with respect to the first component.

34. The apparatus according to claim 32, wherein the measuring member comprises a sleeve attached to the robot arm and configured to surround the modifying member during measuring the first component, and wherein the sleeve is removed from the robot arm to expose the modifying member during modifying the second component.

35. The apparatus of claim 33, wherein a contact tip of the measuring member is positioned at a fixed position with respect to a contact tip of the modifying member when the measuring member surrounds the modifying member.

36. The apparatus of claim 35, wherein the contact tip of the measuring member comprises a hemisphere-shaped contact tip.

37. The apparatus of claim 36 wherein the hemisphere-shaped contact tip comprises a focus and wherein the focus of the contact tip of the measuring member is positioned at a fixed position with respect to a contact tip of the modifying member.

38. The apparatus of claim 31, wherein the modifying member comprises a drill for drilling a second hole in the second component.

39. The apparatus of claim 31, wherein the first and second components comprise aircraft components.

40. The apparatus of claim 31, wherein the first component and the second component comprise a component formed of composite material.

41. The apparatus of claim 31, wherein the first component further comprises a first hole in a first aircraft and wherein the measuring member measures the first hole, and wherein the modifying member comprises a drill, and the modifying member drills a second hole in a second aircraft component so as to conform to the first hole in the first aircraft component.

42. The apparatus of claim 31, wherein the controller is further configured to provide a map of the first hole from the recorded position data, to modify a CAD file using the map, and to create a numerically controlled path for the modifying member based on the CAD file.

* * * * *